United States Patent
Stolk et al.

(12)

(10) Patent No.: US 6,344,242 B1
(45) Date of Patent: Feb. 5, 2002

(54) SOL-GEL CATALYST FOR ELECTROLESS PLATING

(75) Inventors: Richard D. Stolk, Chesterfield; Mark R. Rahe, St Peters, both of MO (US)

(73) Assignee: McDonnell Douglas Corporation, St. Louis, MO (US)

( * ) Notice: Subject to any disclaimer, the term of this patent is extended or adjusted under 35 U.S.C. 154(b) by 0 days.

(21) Appl. No.: 09/393,413

(22) Filed: Sep. 10, 1999

(51) Int. Cl.[7] .............. B05D 3/04; B05D 1/38; B64C 1/00; H01L 29/12; B01J 13/00
(52) U.S. Cl. ............ 427/301; 427/98; 427/304; 427/314; 427/319; 427/320; 427/397.7; 427/402; 427/405; 427/421; 427/429; 427/437; 427/443.1; 106/1.11; 106/287.16; 106/287.17; 106/287.18; 428/620; 244/117 R; 516/99
(58) Field of Search .................... 427/98, 301–304, 427/314–320, 397.7, 402–405, 421, 429, 437, 443.1; 106/1.11, 287.16–287.18; 516/99; 428/620; 244/117 R

(56) References Cited

U.S. PATENT DOCUMENTS

| 4,614,673 | A |   | 9/1986  | Bendig |
|-----------|---|---|---------|--------|
| 4,974,048 | A |   | 11/1990 | Chakravoty et al. |
| 5,120,339 | A | * | 6/1992  | Markovich et al. ............ 65/3.1 |
| 5,358,597 | A |   | 10/1994 | Smith et al. |
| 5,462,897 | A |   | 10/1995 | Baum et al. |
| 5,534,468 | A |   | 7/1996  | Stephenson |
| 5,789,085 | A |   | 8/1998  | Blohowiak et al. |

\* cited by examiner

*Primary Examiner*—Robert Dawson
*Assistant Examiner*—Michael J Feely
(74) *Attorney, Agent, or Firm*—Bryan Cave LLP

(57) ABSTRACT

A sol-gel catalyst composition for electroless plating includes a metal alkoxide in a polar organic solvent, an acid, a chloride salt or acid chloride, and a catalytic metallic salt. The sol-gel catalyst adheres to smooth surfaces without the preconditioning normally associated with other sol-gel smooth surface catalyst, as well as a method for coating a substrate with the sol-gel catalyst composition, and then a metallic plating solution.

24 Claims, No Drawings

SOL-GEL CATALYST FOR ELECTROLESS PLATING

BACKGROUND OF THE INVENTION

1. Field of the Invention

The present invention relates to electroless plating compositions, more particularly, to electroless plating compositions for applying metal films to substrates having smooth surfaces i.e. glass or ceramic surfaces, without using hazardous chemicals or extreme conditions. The present invention is also directed to a process for forming electroless plating compositions and a method of applying these compositions to a substrate.

2. Description of the Prior Art

Multi-layer laminates of metal and dielectric materials are useful in various applications. For example, such coatings may be used as thermal barriers applied to substrates subjected to high temperatures, and as conductive coatings applied to electrical resistance elements.

Traditionally, metallic coatings are applied to substrates in one of three different ways. In the first process, the so called wet method, a slurry of metallic filler and a cementitious or sinterable metal binder is sprayed, in a suitable aqueous or organic solvent, to a desired thickness on the substrate. The substrate is then fired to remove the solvent and any organic binders, and to form or sinter the ceramic binder. In the second process, the so-called dry spray method, the metallic ingredients are sprayed without solvent at a high velocity onto the substrate through a flame or plasma which causes the component materials to melt prior to impact with the substrate. In the third process, the surface of the substrate to be coated (e.g. glass, ceramic or polished metal) is pretreated and a sol-gel is applied to the pretreated substrate to produce solid films in the form of monoliths, thin films, particles or fibers.

These conventional methods suffer from several shortcomings. For example, the traditional wet spray method is quite labor intensive and in situations where direct measurement is impossible, thickness control is difficult. In order to provide metallic coatings of substantial thickness, several layers of coating, each approximately two to three mils thick, must be applied to the part to be coated. Prior to applying each subsequent coat, the part must be dried, i.e., the solvent must be evaporated, to prevent dripping and sagging of the coating and to prevent the solvent from becoming entrapped as subsequent layers are applied. Blistering may occur if any solvent remains entrapped when the next layer is applied. After the coating is built up to a sufficient thickness by applying several layers, it is fired to a temperature sufficient to react the cementitious binder or to sinter the metallic binder.

In the case of cementitious binders and especially in the case of sinterable binders, supplemental organic thickeners are needed to prevent settling, to control rheology, and to impart real strength to the coating so as to minimize shrinkage or cracking during drying. The use of these additives may require slow curing of the coated part to remove organic decomposition products without disrupting the coating structure.

Metallic coatings applied using the traditional wet spray method are often applied from aqueous solutions which require increased drying times and impart an increased porosity to the resulting metallic coatings after drying. Moreover, because the metallic coatings are applied as aqueous solutions, it is extremely difficult to make repairs of damaged components. This is especially true when the part requiring repair is large and must be repaired in the field, e.g., an aircraft wing, or when the damaged portion of the coated part is difficult to access.

Using the conventional dry spray method, specialized equipment is required to apply the coatings. Although this equipment is usually available where the initial coating is applied, it may not be available at locations where coating repairs must be made. Also, the extreme heat and velocity used in this method can damage certain fillers incorporated in the metallic formulations by oxidizing or distorting the fillers on the substrate surface as the composition is applied. Such damage can, in certain instances, impair the performance of the coatings.

When using conventional sol-gel technology extreme conditions are required, usually involving very high temperatures and/or pressures. In addition, some material forms and combinations are just not possible using the existing sol-gel techniques because of the limitations imposed by these older techniques.

Moreover, if a metallic coating is to be applied to a smooth surface, additional steps are required to prepare the surface so that the coating adheres correctly and equally. These steps are required no matter which of the above techniques are utilized. For example, a substrate having a smooth surface must be chemically treated with hazardous chemicals, exposed to extreme conditions or mechanically etched prior to coating. This makes the process even more laborious and therefore more costly.

As stated above, various problems and disadvantages exist with conventional methods for applying metallic coatings to substrates, especially on smooth glass or ceramic surfaces. These problems and disadvantages are overcome by the present invention.

SUMMARY OF THE INVENTION

The present invention provides a sol-gel catalyst composition for electroless plating, a process for producing the sol-gel catalyst composition and a method for applying the sol-gel catalyst composition to a substrate to be coated.

The sol-gel catalyst composition for electroless plating of the present invention comprises:

a metal alkoxide in a polar organic solvent;

an acid in an amount of from about 1 percent by weight to about 30 percent by weight of the composition;

a chloride salt or an acid chloride; and a catalytic metallic salt wherein the metal is selected from the group consisting of Co, Pd, Pt, Ni, Au, and Ag.

The invention also provides a process for producing a sol-gel catalyst composition which comprises:

(a) preparing a metal alkoxide mixture comprising from about 30 percent to about 50 percent by weight of the composition of a metal alkoxide such as tetraethylorthosilicate (TEOS) and a polar-organic solvent;

(b) combining a portion of the metal alkoxide mixture prepared in step (a) with an acidic solution containing an acid dissolved in a polar-organic solvent and allowing the resulting mixture to hydrolyze and cool to room temperature to produce a stock solution for the sol-gel catalyst composition;

(c) preparing a metalic plating solution comprising about 10 percent to about 20 percent by weight of the plating solution of a chloride salt or an acid chloride, about 30 percent to about 40 percent by weight of the plating solution of a catalytic metallic salt, the salt containing a metal selected from the group consisting of Pd, Co, Ni, Au, and Ag and a concentrated acid; and (d) combining a portion of the stock solution prepared in step (b) with a portion of the metallic plating solution prepared in step (c) to produce a sol-gel catalyst composition for electroless plating.

The sol-gel catalyst composition produced is relatively stable, having a shelf-life of greater than six months when stored at room temperature in closed containers.

The invention also provides a method for applying a metal coating composition to a substrate comprising:

(a) applying a portion of the sol-gel catalyst composition of the invention to a substrate and heating the substrate to about 100° C. to about 500° C. for about 10 to about 60 minutes; and (b) contacting the coated substrate from step (a) with a plating solution for a predetermined amount of time.

The amount of time in which the coated substrate is placed in contact with the plating solution is proportional to the thickness of the plating material deposited on the substrate.

DETAILED DESCRIPTION OF THE INVENTION

The metal alkoxide used in the sol-gel catalyst composition of the present invention can be any metal alkoxide. Preferably, it is a member selected from the group consisting of tetraethoxyorthosilicate (TEOS), tetramethoxyorthosilicate (TMOS), aluminum isopropoxide, titanium isopropoxide, zirconium isopropoxide, cerium isoproposide, aluminum butoxide, titanium butoxide, zirconium butoxide, tin 2-ethylhexanoate, tantalum isopropoxide, tantalum ethoxide, indium methoxyethoxide and cerium butoxide. More, preferably, tetramethoxyorthosilicate (TMOS) is used and most preferably tetraethoxyorthosilicate (TEOS) is used.

The metal alkoxide may be mixed or dispersed in any suitable polar organic solvent that has a relatively low boiling point, e.g. isopropyl alcohol. The function of the polar organic solvent in the metal alkoxide solution is to solubilize both the metal alkoxide and the acid. Once the acid is solubilized it causes the sol to gel.

The organic solvent must be volatile, i.e., have a boiling point below about 200° C., preferably below 100° C., so as to facilitate its removal by a low temperature drying process. Mixing the metal alkoxide in a polar organic solvent that has a low boiling point eliminates the need for slow drying and facilitates the development of unique rheology. Solvents used in the sol-gel include lower monohydric alcohols, ketones, glycols, ethers and mixtures thereof, having a boiling point below 200° C. For example, preferred solvents used in the present invention include methanol, ethenol, propanol, butanol, N-methyl-2-pyrrolidinone, 2-methoxy ethanol, 2-methyl-1-propanol, 2-methyl-2-propanol, ethylene glycol, ethylene glycol monoethyl ether, 1-phenol, propyleneglycol monoethyl ether, propyleneglycol monomethyl acetate.

The metal alkoxide mixed with the organic polar solvent is hydrolyzed with acid and stoichiometric amounts of water to form a sol in situ. A wide variety of organic and inorganic acids may be used for this purpose, including nitric acid, hydrochloric acid, hydrofluoric acid, sulfuric acid, phosphoric acid, perchloric acid, formic acid, acetic acid, propionic acid, toluenesulfonic acid, 2-ethylhexanoic acid, benzoic acid, maleic acid, citric acid, lactic acid, oxalic acid, dimethylmalonic acid, malonic acid, chloroacetic acid, dichloroacetic acid, trichloro-acetic acid, trifluoro-acetic acid, trifluoromethane-sulfonlic acid, glutamic acid, glycolic acid and succinic acid.

Once the sol is produced, a metallic solution containing a catalytic metal salt in an organic polar solvent, a chloride salt or an acid chloride, an acid and a stoicheometric amount of water is added to the sol. The addition of an acid to the mixture gels the composition by facilitating hydrolysis of the corresponding metal alkoxide or silica. The catalytic metallic salt that is added to the composition becomes active upon firing and produces a sol-gel catalyst composition. The catalytic metallic salts used in the sol-gel may contain cobalt, nickel, palladium, gold, silver or platinum. Preferably, the catalytic metallic salt used contains palladium or platinum, and most preferably contains palladium.

When using a species containing palladium such as palladium bisacetonitrile dichloride, an aprotic polar solvent is necessary to stabilize the solution. Aprotic solvents that may be used include acetone, methyl-ethyl ketone (MEK), methyl-isobutyl ketone (MIBK), pyridine, dimethylformamide (DMF), dimethylsulfoxide (DMSO), and acetonitrile.

In addition when using palladium and acid that hydrolyzes the sol-gel reaction and stabilizes the palladium by maintaining the palladium species in solution so that any binding with the palladium ions must be released by the firing of the film, may also be used. Of these acids hydrochloric and nitric acids are preferred.

Palladium cations in aqueous solutions tend to hydrolyze and condense much like the metal alkoxides in a sol-gel reaction. Once the particles become sufficiently large then the palladium will precipitate out of the solution. Excess chloride ions in the solution will slow the rate of hydrolysis and increase the stability of the palladium ions. Lowering the pH, preferably by an acid chloride such as hydrochloric acid, will also increase the stability of palladium ions in solution.

Finally, some alkoxides, such as Al (sec-butoxide)$_3$ are so reactive that they require modification by stabilizers such as ethylacetoacetate (etac) to form species such as Al (Osec-Bu)$_2$ (etac) which is a more soluble and less reactive precursor. Titanium isopropoxide is another very reactive alkoxide, which is commonly stabilized using 2-4-pentanedione.

The catalytic metallic salts which are dissolved in the sol-gel may be applied to the substrate to be coated using a number of different ways including spin coating, dipping, painting, brushing, lithography. More, preferably, the sol-gel is applied using spin coating.

After the sol-gel is applied to the substrate, the substrate is fired at a temperature between about 100° C. to about 700° C., preferably between about 250° C. to about 500° C. and most preferably between about 300° C. to about 450° C. to reduce the metal and make the sol-gel catalytic.

Use of the sol-gel catalyst and method for applying a metallic coating of the present invention facilitates electroless plating of thick metal films onto glass and ceramic surfaces without using hazardous chemicals or extreme conditions. The sol-gel catalyst composition can be applied over an entire surface by spinning, spraying or dipping. The catalyst of the present invention may also be applied to selective areas by brushing, printing or silk-screening. Unlike existing methods, no prior etching or conditioning of the surface is required beyond simple cleaning.

The heating process completes the condensation and densification reaction to form an active catalytic film, so that when the catalyst coated substrate is placed in contact with a metallic plating solution for a predetermined amount of time, electroless plating begins immediately. The amount of time that the substrate remains in contact with the plating material is proportional to the thickness applied. In other words, the longer that the substrate is in contact with the plating material the thicker the layer applied.

Once the sol-gel is catalytic it can be applied directly to a substrate having a smooth surface without undertaking some or all of the numerous steps of dipping the substrate into a preconditioning or etching bath; rinsing the preconditioning solution; dipping the substrate into a conventional Pd-Sn bath; rinsing the Pd-Sn solution; dipping the substrate into an accelerator bath which removes the Sn leaving Pd metal on the surface; and finally rinsing the substrate to remove any excess chemicals. The process of the present invention coats substrates having smooth surfaces without having to perform the numerous pre-conditioning steps listed above and therefore makes the process more efficient and cost effective.

Simply stated, the process of the present invention uses very low levels of catalytic metals to coat substrates using the sol-gel of the present invention. This process includes doping the sol gel solutions before it is applied to the surface to be coated. Multiple coatings may be applied to the substrate without the flaking usually associated with such coatings.

The sol-gel catalyst composition produced, bonds strongly to glass, polished alumina or ceramic surfaces and to the catalytic metal as well. It may also be applied to other metallic substrates such as polished copper, tin, steel, or alloys containing several different components. Once the catalyst is applied, the substitute is placed in contact with a plating solution that reacts with the catalyst and plates the substrate. The metal plating applied will then be electrically insulated from the substrate by the catalyst layer. This may be particularly useful to the microcircuit industry. For example, circuit boards and other electrical components that need to be insulated from the substrate may be produced by the method described above.

Other substrates that may be coated with the composition of the invention may include airplane parts, such as, wings, hatches, fins, tails, and other smooth surfaces associated with the aircraft industry.

The present invention is described further in the following examples which are presented solely for the non-limiting purpose of further illustrating the invention.

EXAMPLES

Example 1

Part A:
31.3 ml of tetraethoxyorthosilicate (TEOS) was dissolved in 68.7 ml isopropanol.
Part B:
2.6 ml of nitric acid was mixed with 9.6 ml of deionized water. The diluted acid was then mixed with 108 ml isopropyl alcohol.

Part C:
0.19 g sodium chloride was dissolved in 4.9 ml deionized water. 1.3 ml concentrated nitric acid was then added. Finally, 0.4 g palladium nitrate was dissolved into this solution. A clear, deep red colored solution was formed.

Part A was added to Part B, the resulting solution was allowed sufficient time to hydrolyze and cool down to room temperature. A glass microscope slide was dipped into this solution and withdrawn at a rate of about 2 cm/min. After the solvent evaporated from the coating, the slide was heated to about 500° C. for about five minutes. This produced a glassy transparent coating of about 160 nanometers thick.

Example 2

One part by volume of concentrated nitric acid was added to 30 parts by volume of the solution made by combining Part A and Pait B described in Example 1. To this one part by volume of the Part C solution described in Example 1 was added to form a clear, brownish yellow colored solution with a viscosity particularly suited for spin coating applications.

A glass microscope slide was spin-coated with the above solution at about 3000 revolutions per minutes (rpm) for about 20 seconds, producing an almost transparent film on the slide. The slide was then heated to about 300° C. for about 30 minutes or 400° C. for about 10 minutes.

The slide was then placed in contact with an electroless cobalt plating solution containing 0.025 mol/dm$^3$ of dimethylamine-borane, 0.30 mol/dm$^3$ of $(NH_4)\ SO_4$, 0.55 mol/dm$^3$ of $Na_2C_4H_4O_6$, $2H_2O$ and 0.10 mol/dm$^3$ of $Co\ SO_4$ $7H_2O$. The pH of the bath was adjusted to 9.0 by adding NaOH and operated at 70° C. for about 30 minutes. A metal film about 500 nm thick was produced on the slide. The plating was smooth, shiny and adherent.

Another slide was coated and fired and then placed in contact with an electroless nickel plating solution (i.e. Niposit 468 from the Shipley Co.) for about 30 minutes to produce a metal film of about 500 nm thick. Placing a coated slide in contact with the electroless plating solution for a longer time formed a thicker coating.

Example 3

Stock solutions Part A, Part B and Part C were prepared according to example 1. Part A was then added to Part B and was vigorously mixed. The resulting solution was aged overnight. The solutions described as XP1 through XP4 in Table 1 were prepared from these with additional amounts of isopropyl alcohol, acid and water as necessary. XP1 decomposed and was not tested.

A glass microscope slide was spin-coated at 3000 rpm for 20 seconds, dried in air, then baked at 538° C. for 30 minutes. Each slide was electroless nickel-plated using Niposit 468 at 66° C. for five minutes. Below is a table of Sol-Gel Catalyst formulations tested:

TABLE 1

Sol-Gel Catalyst formulations

| | Solution Formulations | | | | | | | Calculated Quantities | | | | | |
|---|---|---|---|---|---|---|---|---|---|---|---|---|---|
| XP | IPA mL | SOG Type | SOG mL | HCl mL | PdStk mL | PdStk Type | Notes | Totvol mL | TotH$_2$O mL | Pd M | TEOS M | HCl M | HNO$_3$ M |
| 1 | 5 | A | 0.5 | 0 | HNO$_3$ | 0.5 | Decomp | 6 | 0.469 | 0.019 | 0.055 | 0.00 | 0.003 |
| 2 | 5 | A | 0.5 | 0.05 | HNO$_3$ | 0.25 | | 5.8 | 0.25 | 0.010 | 0.057 | 0.11 | 0.003 |
| 3 | 5 | A | 5 | 0.05 | HNO$_3$ | 0.5 | | 10.55 | 0.736 | 0.011 | 0.311 | 0.06 | 0.011 |
| 4 | 2.5 | A | 0.125 | 0.025 | HNO$_3$ | 0.5 | | 3.15 | 0.447 | 0.036 | 0.026 | 0.10 | 0.004 |
| 5 | 2.5 | B | 0.125 | 0.025 | HCl | 0.5 | | 3.15 | 0.477 | 0.057 | 0.027 | 0.10 | 0.000 |

Plating was examined visually for coverage and plating thickness determined by weight gain. An adhesion test was performed using scotch tape. Below are results from the Sol-Gel Catalyst experiments conducted above:

TABLE 2

Sol-Gel Catalyst Experimental Results

| SL | Catalyst Form | Coverage | Plating Thickness (nm) | Tape Test | Comments |
|---|---|---|---|---|---|
| 2 | XP2 | 0% | 0 | | |
| 3 | XP3 | 100% | 240 | Fail | One pinhole, bright surface |
| 4 | XP4 | 100% | 350 | Fail | Several pinholes, bright surface |
| 5 | XP5 | 100% | 310 | Fail | Plating surface semi-bright |

SL3, SL4 and SL5 was baked at 538° C. for two hours and then passed the tape test but the metal surface oxidized and turned a blue color.

Example 4

This example was conducted using Part A and Part B according to the procedure in Example 3 and Part D solution listed below:

Part D 0.4 g of PdCl$_2$ was dissolved in 5ml of deionized water. 1.3 ml of concentrated HCl was then added.

The results are shown in table 1 and table 2 shown in Example 3.

Although the method and compositions hereof have been described in detail with references to certain preferred versions thereof, it will be understood that variations may be made therein without departing from the spirit and scope of the present invention.

What is claimed is:

1. A composition for forming a sol-gel catalyst for electroless plating, comprising:

a metal alkoxide mixed with a polar organic solvent;

an acid in an amount from about 1 percent by weight to about 30 percent by weight of the composition;

a chloride salt or an acid chloride; and a catalytic metallic salt wherein the metal is selected from the group consisting of Pd, Pt, Ni, Co, Au and Ag.

2. The composition of claim 1, wherein the metal alkoxide is selected from the group consisting of tetraethoxyorthosilicate (TEOS), tetramethoxyorthosilicate (TMOS), aluminum isopropoxide, titanium isopropoxide, zirconium isopropoxide, cerium isopropoxide, aluminum butoxide, titanium butoxide, zirconium butoxide, tin 2-ethylhexanoate, tantalum isopropoxide, tantalum ethoxide, indium methoxyethoxide, and cerium butoxide.

3. The composition of claim 2, wherein the polar organic solvent is selected from the group consisting of lower monohydric alcohols, ketones, glycols, ethers and mixtures thereof, having a boiling point below 100° C.

4. The composition of claim 3 wherein the polar solvent is isopropyl alcohol and the metal alkoxide is tetraethoxyorthosilicate (TEOS).

5. The composition of claim 3, wherein the lower monohydric alcohol is selected from the group consisting of methyl, ethyl, isopropyl, n-propyl, n-butyl, sec-butyl, and t-butyl.

6. The composition of claim 1, wherein the catalytic metallic salt is palladium nitrate and the acid is nitric acid.

7. A process for forming a sol-gel catalyst composition, comprising:

(a) preparing a metal alkoxide mixture comprising from about 30 percent to about 50 percent by weight of the composition of metal alkoxide and a polar-organic solvent;

(b) combining a portion of the metal alkoxide mixture prepared in step (a) with an acidic solution containing an acid dissolved in a polar-organic solvent and allowing the resulting mixture to hydrolyze and cool to room temperature to produce a stock solution for a catalyst;

(c) preparing a metallic plating solution comprising about 10 percent to about 20 percent by weight of the metallic plating solution of a chloride salt or an acid chloride, about 30 percent to about 40 percent by weight of the metallic plating solution of a catalytic metallic salt, the catalytic metallic salt containing a metal selected from the group consisting of Pd, Co, Ni, Au, and Ag and a concentrated acid; and (d) combining a portion of the stock solution prepared in step (b) with a portion of the metallic plating solution prepared in step (c) to produce a sol-gel catalyst composition for electroless plating.

8. The process of claim 7 wherein the metal alkoxide is selected from the group consisting of tetraethoxyonthosilicate (TEOS), tetramethioxyorthosilicate (TMOS), aluminum isopropoxide, titanium isopropoxide, zirconium isopropoxide, cerium isopropoxide, aluminum butoxide, titanium butoxide, zirconium butoxide and cerium butoxide.

9. The process of claim 8 wherein the polar-organic solvent is selected from the group consisting of lower monohaydric alcohols, ketones, glycols, ethers, and mixtures thereof, having a boiling point below 200° C.

10. The process of claim 9 wherein the polar organic solvent is isopropyl alcohol and the metal alkoxide is tetraethoxyorthosilicate (TEOS).

11. The process of claim 8 wherein the metallic salt used to prepare the metal plating solution in palladium nitrate and the chloride salt is sodium chloride.

12. A method according to claim 6 wherein the metallic salt used to prepare the metallic plating solution is palladium nitrate.

13. A method according to claim 6 wherein the metal alkoxide mixture prepared in step (a) contains about 31.3 ml of tetraethoxyorthosilicate (TEOS) dissolved in about 68.7 ml of isopropanol.

14. A method according to claim 6 wherein the metallic plating solution comprises about 0.4 g palladium nitrate and about 0.19 grams of sodium chloride dissolved in a solution containing about 1.3 ml of concentrated nitric acid and about 5 ml of deionized water.

15. A method for applying a metal coating to a substrate comprising:

(a) applying the sol-gel catalyst composition of claim 1 to the substrate and heating the substrate to about 100° C. to about 500° C. for about 10 to about 60 minutes; and (b) contacting the coated substrate from step (a) with an electroless plating solution.

16. A method according to claim 15 wherein the substrate is heated to about 250° C. to about 500° C. for about 25 to about 55 minutes.

17. A method according to claim 15 wherein the substrate is heated to about 300° C. to about 400° C. for about 30 to about 50 minutes.

18. A method according to claim 14 wherein the substrate is heated to about 300° C. for about 30 minutes.

19. A method according to claim 15 wherein the sol-gel catalyst composition is applied to the substrate by a method selected from the group consisting of spraying, dipping, brushing, printing, silk-screening and lithographing.

20. A method according to claim 15 wherein the sol-gel catalyst solution is applied to the substrate by spin-coating at about 3000 revolutions per minute for about 20 seconds.

21. A method according to claim 20 wherein the substrate is heated to about 400° C. for about 10 minutes.

22. A method according to claim 20 wherein the sol-gel catalyst coated substrate is placed in contact with the electroless plating solution for about 30 minutes.

23. The method of claim 15, wherein the substrate is an electronic microcircuit.

24. The method of claim 15, wherein the substrate is an airplane part selected from the group consisting of hatch, latch, wing, fin, flap, wall, and surface of the airplane.

* * * * *

UNITED STATES PATENT AND TRADEMARK OFFICE
CERTIFICATE OF CORRECTION

PATENT NO. : 6,344,242 B1
DATED : February 5, 2002
INVENTOR(S) : Richard D. Stolk et al.

It is certified that error appears in the above-identified patent and that said Letters Patent is hereby corrected as shown below:

Column 9,
Line 16, delete "to" and insert therefore -- between --.
Line 21, delete the first occurrence of "to" and insert therefore -- between --.

Column 10,
Line 2, delete the first occurrence of "to" and insert therefore -- between --.
Line 4, change "14" to -- 15 --.

Signed and Sealed this

Eighteenth Day of February, 2003

JAMES E. ROGAN
*Director of the United States Patent and Trademark Office*